United States Patent
Gerdes et al.

(10) Patent No.: US 7,073,335 B2
(45) Date of Patent: Jul. 11, 2006

(54) GAS STORAGE POWER STATION

(75) Inventors: Ralf Gerdes, Untersiggenthal (CH); Peter Keller-Sornig, Baden (CH); Ilja Tuschy, Heidelberg (DE)

(73) Assignee: ALSTOM Technology Ltd., Baden (CH)

( * ) Notice: Subject to any disclaimer, the term of this patent is extended or adjusted under 35 U.S.C. 154(b) by 207 days.

(21) Appl. No.: 10/218,568

(22) Filed: Aug. 15, 2002

(65) Prior Publication Data

US 2003/0037548 A1    Feb. 27, 2003

Related U.S. Application Data

(60) Provisional application No. 60/312,766, filed on Aug. 17, 2001.

(51) Int. Cl.
*F02C 1/00* (2006.01)
*F02G 3/00* (2006.01)

(52) U.S. Cl. .............. 60/727; 60/792; 60/788; 60/39.22; 290/52

(58) Field of Classification Search ............. 60/791, 60/792, 788, 793, 39.22, 801, 803, 727; 290/52, 290/406, 40 B, 40 C, 54, 2, 1 R, 1 A
See application file for complete search history.

(56) References Cited

U.S. PATENT DOCUMENTS

| | | | | |
|---|---|---|---|---|
| 2,322,987 A | * | 6/1943 | West .................. 60/39.511 |
| 3,151,250 A | * | 9/1964 | Carlson ............... 290/52 |
| 4,204,258 A | * | 5/1980 | Zitelli et al. ............ 700/290 |
| 4,352,024 A | * | 9/1982 | Geary et al. ............. 290/52 |
| 4,414,805 A | * | 11/1983 | Walker .................. 60/792 |
| 4,423,593 A | * | 1/1984 | Zagranski et al. ......... 60/791 |
| 4,492,874 A | * | 1/1985 | Near .................. 290/40 B |
| 4,578,955 A | * | 4/1986 | Medina .................. 60/709 |
| 4,872,307 A | * | 10/1989 | Nakhamkin ............... 60/772 |
| 4,878,347 A | * | 11/1989 | Kawamura ............... 60/608 |
| 5,042,246 A | * | 8/1991 | Moore et al. ............. 60/773 |
| 5,148,668 A | * | 9/1992 | Frutschi ................ 60/775 |
| 5,311,062 A | * | 5/1994 | Farkas ................. 290/4 R |
| 5,391,925 A | * | 2/1995 | Casten et al. ........... 290/1 R |
| 5,408,821 A | * | 4/1995 | Romero et al. ............ 60/778 |
| 6,035,629 A | * | 3/2000 | Hilgeman et al. .......... 60/773 |
| 6,107,693 A | | 8/2000 | Mongia et al. |
| 6,125,625 A | * | 10/2000 | Lipinski et al. ........... 60/801 |
| 6,145,296 A | * | 11/2000 | Rakhmailov .......... 60/39.162 |
| 6,153,943 A | | 11/2000 | Mistr, Jr. |

(Continued)

FOREIGN PATENT DOCUMENTS

| | | |
|---|---|---|
| CH | 659855 A5 | 2/1987 |
| DE | 4138288 A1 | 6/1993 |

OTHER PUBLICATIONS

John Daly, "CAES—Reduced to Practice", ASME Turbo Expo 2001, Jun. 4-7, 2001, New Orleans, Louisiana.

(Continued)

*Primary Examiner*—William H. Rodriguez
(74) *Attorney, Agent, or Firm*—Buchanan Ingersoll PC

(57) ABSTRACT

The present invention relates to a gas storage power station (1) having a turbine group (3) and a compressor group (4). The turbine group (3) has at least one turbine (5, 6) and a generator (10). During normal operation of the turbine group (3), the generator (10) emits power directly to a main load (11). The compressor group (4) has at least one compressor (12) and one electric motor (15). The gas storage power station (1) furthermore has a power consumption device (20), which can be activated in order to consume turbine and/or generator power.

15 Claims, 3 Drawing Sheets

U.S. PATENT DOCUMENTS 6,240,730 B1 *  6/2001  Thiele ........................ 60/646
6,305,158 B1 * 10/2001  Nakhamkin et al. ....... 60/39.53
6,418,707 B1 *  7/2002  Paul ............................ 60/784
6,637,205 B1 * 10/2003  Ahmad et al. ................ 60/608
6,735,951 B1 *  5/2004  Thompson ................... 60/774

OTHER PUBLICATIONS

Gavin W. Gaul, "Compressed Air Energy Storage Offers Flexibility for Low Cost Providers of Electricity", Power-Gen 1995.

* cited by examiner

GAS STORAGE POWER STATION

This application claims priority under 35 U.S.C. § 119 to U.S. Provisional Application No. 60/312,766 entitled COMPRESSED AIR ENERGY SYSTEM and filed on Aug. 17, 2001, the entire content of which is hereby incorporated by reference.

TECHNICAL FIELD

The invention relates to a gas storage power station having at least one turbine group and at least one compressor group, and to the features of the precharacterizing clause of claim 1.

PRIOR ART

At "Power-Gen 1995", Gavin W. Paul from the Westinghouse Electric Corporation, Michael McGill from the Tejas Power Corporation and Robert W. Kramer, Ph.D from the Northern Indiana Public Service Company presented their treatise entitled "COMPRESSED AIR ENERGY STORAGE OFFERS FLEXIBILITY FOR LOW COST PROVIDERS OF ELECTRICITY". This treatise describes a gas storage power station of the type mentioned initially, whose turbine group has two turbines and one generator, which are connected to one another for drive purposes via a turbine shaft. The compressor group has a compressor as well as an electric motor, which are connected to one another for drive purposes via a compressor shaft. The turbine group and the compressor group are decoupled from one another for drive purposes, that is to say, firstly, that the turbine shaft and the compressor shaft cannot be connected to one another, which is referred to as a "multi-shaft arrangement". Secondly, this means that the generator operates exclusively as a generator, and the electric motor operates exclusively as an electric motor.

Such a gas storage power station is generally used within a so-called "Compressed air energy storage system" or CAES system, for short. The basic idea of such a CAES system is to store excess (valuable) energy which is produced by the permanently operated, conventional power station systems during basic load time (for example at night and at weekends). For this purpose, the excess energy is used to operate the compressor group which has been mentioned, and which pumps air or some other gas to a gas store, which is at a relatively high pressure. When required for generating electricity using the turbine group, the air or the gas can be drawn from this gas store. Energy is thus stored in the gas store, such that it can be drawn off in the form of potential energy. Worked-out coal mines or salt mines are used, for example, as stores.

At the "ASME TURBO EXPO 2001", John Daly, R. M. Loughlin from the Dresser-Rand, Mario DeCorso, David Moen from Power Tech Associates, Inc. and Lee Davis from the Alabam Electric Cooperative, Inc. presented their treatise "CAES-REDUCED TO PRATICE". This treatise likewise describes a gas storage power station of the type mentioned initially. In this case, however, the turbine group and the compressor group are connected to a jointly used electrical machine via clutches in a so-called "single-shaft arrangement", and this electrical machine can be operated alternately as a generator for the turbine group and as an electric motor for the compressor group. In order to charge the gas store, the generator/electric motor unit operates as an electric motor and is permanently connected to the compressor shaft, while the turbine shaft is decoupled. The electric motor then accordingly drives the compressor. For electricity generation, the generator/electric motor unit operates as a generator, and is permanently connected to the turbine shaft, while it is decoupled from the compressor shaft. The turbines can accordingly drive the generator.

In order to generate electrical energy using the gas storage power station, the turbine group must be started, connected to the generator. Electricity which is produced by the generator can be fed directly into the public grid system only when the generator is synchronized to the grid system, that is to say when the turbine shaft has reached its nominal rotation speed. The drive power of the turbine itself is used to accelerate the turbine shaft from rest up to the nominal rotation speed. The turbine power must considerably exceed the friction losses in order to achieve rapid acceleration. However, on synchronization to the grid system, the turbine power must not be higher than the power loss, in order to prevent further acceleration of the shaft above the nominal rotation speed before connection to the grid system.

As soon as the generator is connected directly to the grid system, it emits electrical power to this grid system, and consumes drive power via the turbine shaft. A considerable amount of control complexity is required in order to accomplish the transition from acceleration to synchronization and power emission to the grid system. A corresponding situation applies, with the opposite mathematical sign, in the situation where the generator is disconnected from the grid system in order to end the feeding of electricity. A considerable amount of control complexity must also be accepted in this case, in order that the excess drive power provided by the turbine shaft does not lead to acceleration of the turbine shaft. The turbine power must be reduced below the power loss, in order to decelerate the turbine shaft.

In principle, these problems during connection of the generator to the grid system and/or during disconnection of the generator from the grid system can also occur in a conventional power station system but, for various reasons, these problems are not so severe there. In the case of rapid-starting conventional gas turbine systems, a considerable proportion of the drive power of the turbine shaft is consumed by the compressor which is coupled to it, which makes it considerably easier to control the turbine shaft rotation speed. Conventional power station systems based on steam turbines are designed for permanent operation and have to be disconnected and started only very rarely. A considerably longer time period is often provided for starting in this case. In contrast to this, the turbine group of a gas storage power station must be rapidly started at the peak load times, and then disconnected from the grid system once again, relatively frequently, in particularly daily, in accordance with the fundamental idea of a CAES system, as explained above. The requirement for simplification of the starting and stopping procedures is accordingly particularly important in this case.

DESCRIPTION OF THE INVENTION

The invention is intended to provide assistance here. The invention, as it is characterized in the claims, deals with the problem of indicating an approach for a gas storage power station of the type mentioned initially which allows the complexity for setting a specific turbine setting to be reduced.

This problem is solved by a gas storage power station having the features of claim 1. Advantageous embodiments are the subject matter of the dependent claims.

The invention is based on the general idea of providing a power consumption device which allows turbine power and/or generator power, that is to say in particular mechanical drive power from the turbine and/or electrical power from the generator, to be consumed as a function of the need, That is, the power consumption device can convert mechanical turbine power to electrical power for use by an electrical consumer, or it can transfer electrical generator power to an electrical consumer, such that energy is thereby taken out of the system in a controlled manner and the power consumption device is able to control both acceleration and deceleration of the turbine. In consequence, it is possible to tap off power from the turbine group even when the generator is not yet connected, or is no longer connected, directly to the intended main load. For example, this power consumption device makes it possible to produce a load which prevents acceleration of the turbine, without changing the magnitude of the turbine power, while the generator is being disconnected from the predetermined main load. The load consumption, which can be controlled or regulated, simplifies the operation of the turbine group in all operating phases, in particular during load changes by the main load, and thus improves the reliability during operation of the power station system.

In one development, it is possible to provide for the power consumption device to have a control and/or regulating device, which controls and/or regulates the power consumption of the power consumption device such that the turbine rotation speed does not exceed a predetermined threshold value, irrespective of the turbine power. This embodiment takes account, in particular, of the situation in which the generator is being disconnected from supplying the main load directly.

Alternatively or additionally, such a control and/or regulating device can also regulate and/or control the power consumption device such that its power consumption compensates for any difference between a nominal power, which is emitted from the generator directly to the main load during normal operation of the turbine group, and a higher actual power, which is emitted from the turbine group once the power loss has been subtracted. Any change in the direct power emission from the generator to the main load then has no effect on the at least one turbine, so that the rotation speed of the turbine also remains constant. By way of example, when the direct power emission is connected to the main load or when this direct power emission to the main load is disconnected, the power consumption device is respectively disconnected or connected with the appropriate power to be supplied from the generator to the main load, so that the same amount of power is drawn off the turbine before, during and after the switching process.

Further important features and advantages of the gas storage power station according to the invention can be found in the dependent claims, in the drawings and in the associated description of the figures based on the drawings.

BRIEF DESCRIPTION OF THE DRAWINGS

Preferred exemplary embodiments of the invention are illustrated in the drawings and will be explained in more detail in the following description, with the same reference symbols referring to identical, functionally identical or similar features. In the figures, in each case schematically.

Approaches to Implementation of the Invention

Figure 1:
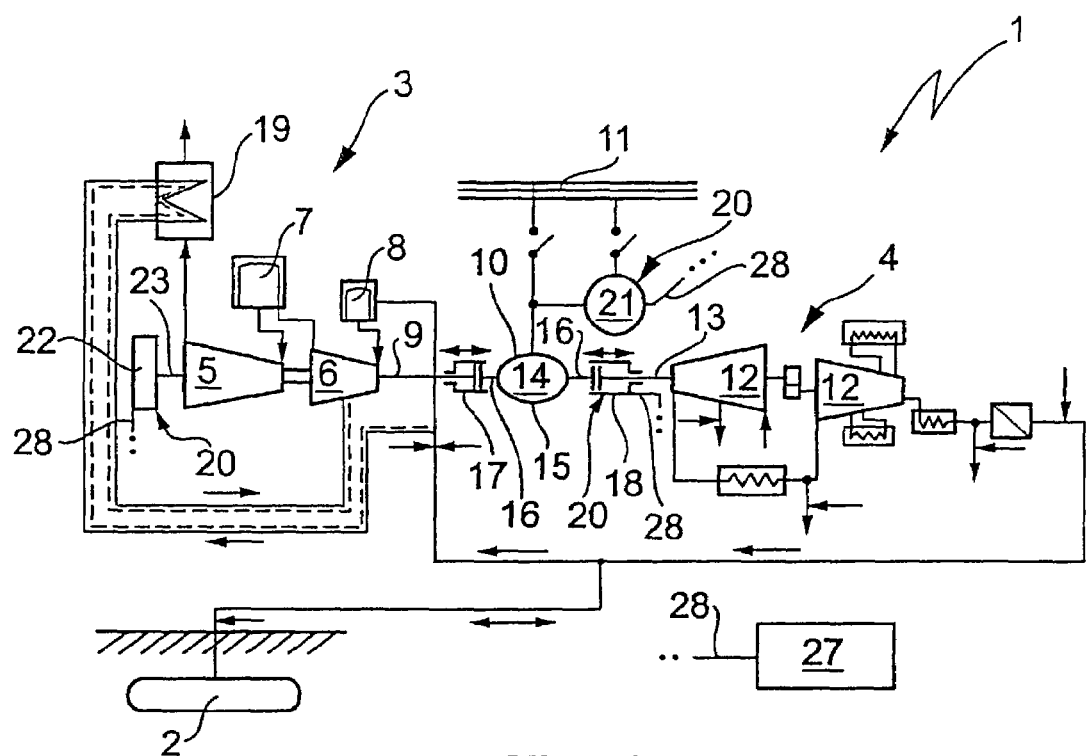
FIG. 1 shows an outline illustration, in the form of a circuit diagram, of a gas storage power station according to the invention.

As shown in FIG. 1, a gas storage power station 1 according to the invention has a gas store 2, a turbine group 3 and a compressor group 4. Since a gas storage power station 1 such as this is normally operated with air as the gas, a system such as this may also be referred to as an air storage power station. Although the embodiment of the gas storage power station 1 described here has only one turbine group 3 and only one compressor group 4, it is obvious that an embodiment with a number of turbine groups 3 and/or with a number of compressor groups 4 is also possible.

In the embodiment described here, the turbine group 3 has two turbines, namely a main turbine 5 and an additional turbine 6. An embodiment is likewise possible which has only a single turbine, as is an embodiment with more than two turbines. The main turbine 5 is preceded by a main combustion chamber 7. The additional turbine 6 may also be preceded by an additional combustion chamber 8, in a corresponding manner. The two turbines 5 and 6 drive the generator 10 via a common turbine shaft 9, and the generator 10 can be connected directly to a predetermined main load 11. This main load 11 is normally formed by the public electricity supply grid system, into which the electrical power produced by the generator 10 is fed.

In this case, the compressor group 4 has two compressors 12, which are arranged in series and can be driven via a compressor shaft 13. In this case as well, more or less than two compressors 12 may once again be provided, in another embodiment.

The specific embodiment described here is a single-shaft arrangement, in which the generator 10 is formed by a generator/electric motor unit 14, which can be connected either as a generator 10 or as an electric motor 15. The compressors 12 can accordingly be driven by the electric motor 15 via the compressor shaft 13. In order to allow the generator/electric motor unit 14 to be operated not only as a generator 10 in the turbine group 3 but also as an electric motor 15 in the compressor group 4, a rotor 16 of the generator/electric motor unit 14 can firstly be connected to the turbine shaft 9 via a turbine clutch 17, and can secondly be connected to the compressor shaft 13 via a compressor clutch 18.

A gas storage power station 1 such as this operates as follows:

In times during which excess electricity is available, the gas store 2 is charged with the aid of the compressor group 4, with the generator/electric motor unit 14 then being connected as an electric motor 15. The turbine clutch 17 is then opened, while the compressor clutch 18 is closed. In times when the electricity requirement is greater, the turbine group 3 is activated, in order to generate electricity. The generator/electric motor unit 14 is then connected as a generator 10, with the turbine clutch 17 being closed while the compressor clutch 18 is open. In order to increase the power and/or improve the efficiency of the turbine process, the exhaust gas heat from the main turbine 5 can be used to preheat the gases in a recuperator 19.

During normal operation of the turbine group 3, the generator 10 emits to the main load 11 the electrical power which is generated and which must be supplied as mechanical power to the generator 10 via the turbine shaft 9. Direct power emission from the generator 10 to the main load 11 is possible, particularly when the main load 11 is the public power supply grid system, only when the turbine shaft 9 is at a predetermined rotation speed. The components of the turbine group 3 are designed for this nominal rotation speed. In order to prevent damage to the components of the turbine grid 3, it is thus necessary to ensure that the turbine shaft 9 does not exceed, or does not significantly exceed, the nominal rotation speed.

According to the invention, the gas storage power station 1 has a power consumption device 20 which can consume turbine power and/or generator power, i.e., by transferring turbine power and/or generator power to an electrical consumer, and thereby control turbine acceleration. As one skilled in the art would understand, an electrical consumer defines a device that consumes electric power such as, for example, a mechanical device that requires electricity to operate. FIG. 1 shows three different variants of this power consumption device 20 for the gas storage power station 1, which can be used cumulatively or alternatively, as well as in other combinations.

The power consumption device 20 may, for example, have a static frequency converter 21. This frequency converter 21 may draw electrical power from the generator 10, and may emit this electrical power to at least one additional load. The frequency converter 21 in this case converts the various input frequencies arriving on the input side to a constant required frequency on its output side in order in this way to make it possible to draw power from the generator 10 even when the rotation speed of the turbine shaft 9 has not yet reached, or is no longer, at the desired nominal rotation speed. In the particularly advantageous embodiment described here, the additional load which is supplied from the frequency converter 21 is identical to the main load 11, with the power now being supplied to the main load 11 by the generator 10 indirectly via the frequency converter 21. Power can accordingly be drawn from the generator 10, and can be fed to the main load 11, even while the turbine group 3 is being accelerated.

Alternatively or additionally, the power consumption device 20 may have a braking device. This braking device can be connected, in particular in a controlled and/or regulated manner, to a shaft which is driven by the turbines 5 and 6, and can thus draw off drive power. For example, this braking device may have a flywheel 22, which stores the drawn-off drive power as kinetic energy. The flywheel 22 is in this case driven via a shaft 23, which is driven directly by the main turbine 5.

Alternatively or additionally, this braking device may also be formed by the compressor clutch 18, which is then designed such that it can be controlled and/or regulated in an appropriate manner. In addition to the turbine clutch 17, the compressor clutch 18 is closed in order to draw off drive power. The drive power from the turbine group 3 is consumed entirely or partially by the compressor group 12, or only the excess drive power is consumed by the compressor group 12. This allows the rotation speed of the turbine group 3 to be kept constant, or to be increased or decreased, depending on the requirement.

In FIGS. 2 to 5, the gas storage power station 1 is in each case in the form of a multi-shaft arrangement, in which the turbine shaft 9 cannot be coupled directly to the compressor shaft 13. In particular, this allows the compressor group 4 and the turbine group 3 to be operated independently of one another. In the embodiments in FIGS. 2 to 5, the turbine group 3 in each case once again comprises the main turbine 5, the additional turbine 6, the main combustion chamber 7 and the recuperator 19. In this case, a burner 24 is arranged between the main turbine 5 and the recuperator 19, in order to indirectly increase the maximum achievable temperature level of the gases, which are heated in the recuperator 19 and are supplied to the additional turbine 6. The turbines 5 and 6 drive the generator 10 via the turbine shaft 9, and the generator 10 feeds the main load 11 directly during normal operation.

Figure 2:
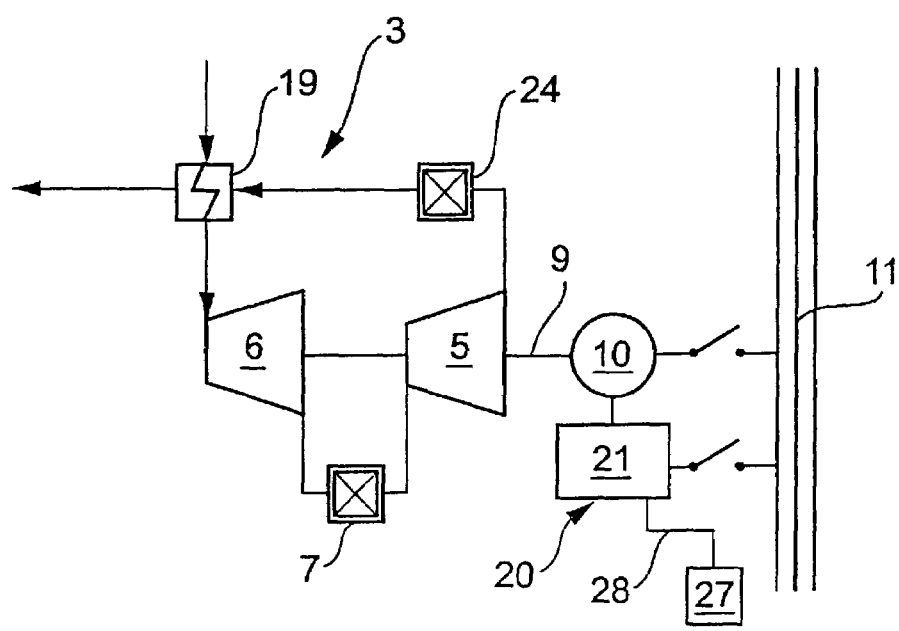
FIGS. 2 to 5 show outline illustrations, in the form of circuit diagrams, of a turbine group in a gas storage power station according to the invention, but with different embodiments.

In the embodiment shown in FIG. 2, the power consumption device 20 is once again formed by the static frequency converter 21, which is connected to the generator 10. In this embodiment as well, the frequency converter 21 feeds the main load 11 when the generator 10 has not yet been connected, or is no longer connected, directly to its main load 11.

Figure 3:
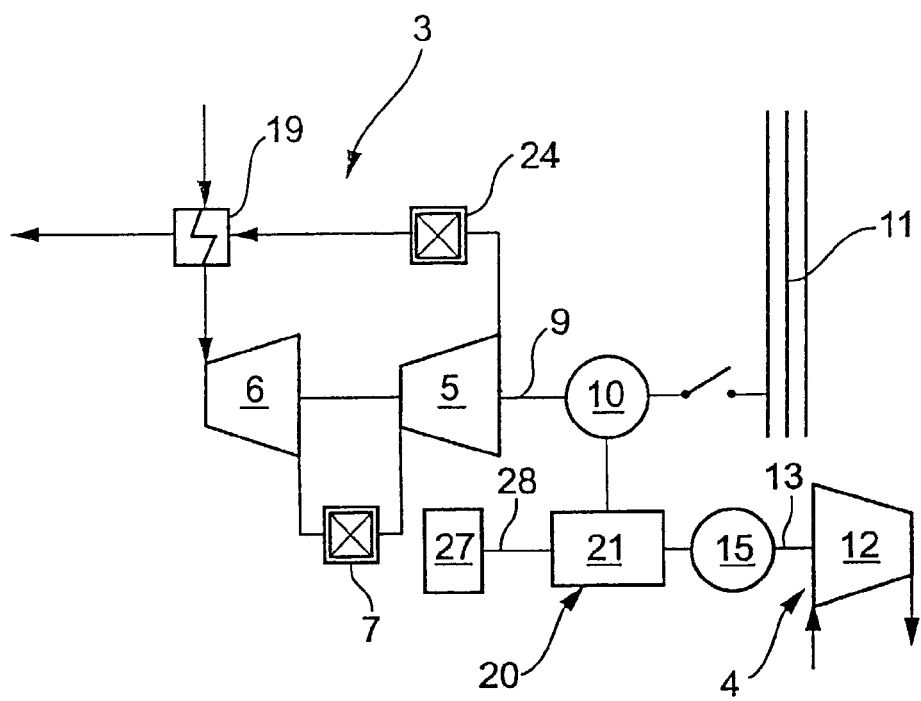

As shown in FIG. 3, the additional load which is supplied with electric power from the frequency converter 21 may be formed by the electric motor 15 in the compressor group 4. In this way, even in a multi-shaft arrangement, the power which is drawn off from the turbine group 3 can also be used to operate the compressor group 4.

Figure 4:
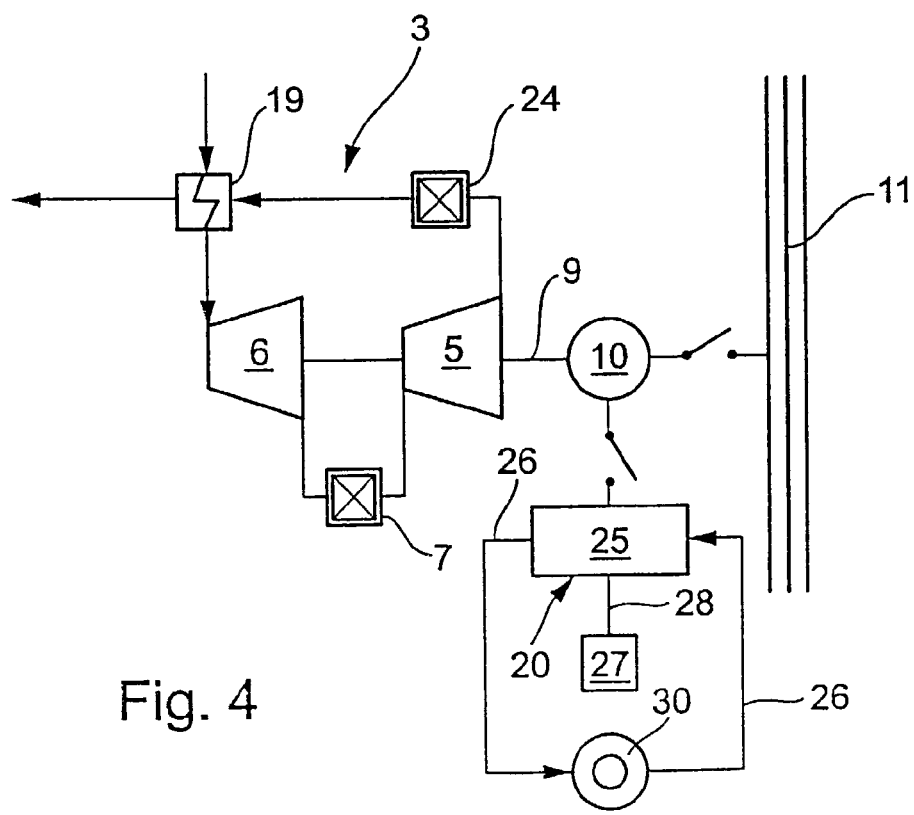

As shown in FIG. 4, the power consumption device 20 may also have an electrical resistor 25, which draws electrical power from the generator 10 when it is activated. This electrical power is in this case converted to heat, and can be drawn from the resistor 25 with the aid of an appropriate cooling circuit 26, and can be supplied to an appropriate heat sink 30. By way of example, this allows the gas which is stored in the gas store 2 to be heated.

Figure 5:
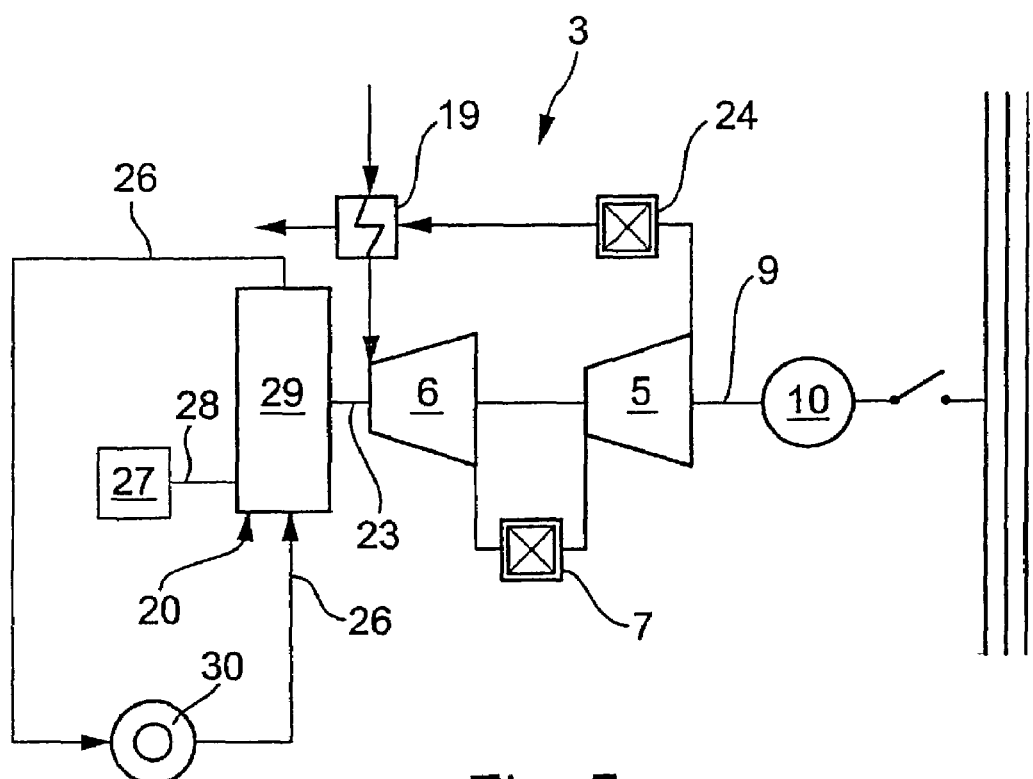

In the embodiment shown in FIG. 5, the power consumption device 20 is once again in the form of a braking device, which draws drive energy from the turbine group 3 via the shaft 23 which is driven by the turbines 5 and 6. This braking device may be formed, for example, by a friction brake 29, which is not explained in any more detail but essentially converts the drive power that is drawn off to heat. In this case as well, the heat which is produced can be dissipated with the aid of the cooling circuit 26, and can expediently be supplied to an appropriate heat sink 30.

However, the braking device may also be in the form of an impulse wheel for producing and/or diverting a fluid flow; any heat which may be produced in the process can likewise be dissipated.

With reference to the embodiments shown in FIGS. 1 to 5, it is expedient for the power consumption device 20 to also have a control and/or regulating device 27, by means of which the power consumption of the power consumption device 20 can be controlled and/or regulated. For this purpose, the control and/or regulating device 27 is connected via appropriate control lines or regulating lines 28 to the respective controllable component of the power consumption device 20. In order to prevent damage to the components in the turbine group 3, this control and/or regulating device 27 is expediently designed such that it in each case regulates and/or controls the power consumption device 20 such that the turbine rotation speed does not exceed a predetermined set value. This makes it possible to avoid the turbine rotation speed increasing when, for example, the generator 10 is disconnected from the main load 11.

The control complexity for the turbine group 3 for activation of the direct connection between the generator 10 and the main load 11 and for deactivation of this connection can in fact be considerably simplified when, for example, it is necessary to produce the same drive power before, during and after the connection or disconnection of the turbines 5 and 6. The control and/or regulating device 27 thus expediently controls and/or regulates the power consumption of the load consumption device 20 in this case such that the power consumption device 20 compensates, during the transition, for any power difference which occurs between the actual power which is instantaneously emitted from the generator 10 directly to the main load 11 and the desired nominal power from the turbine group 3.

In addition to these switching processes, the operation can be handled more easily and, in particular, can be controlled more reliably in all the operating states of the turbine group 3 if it is possible to draw a greater or lesser amount of power from the turbine shaft 9 and/or from the generator 10 via the power consumption device 20, depending on the requirement.

| List of reference symbols | |
|---|---|
| 1 | Gas storage power station |
| 2 | Gas store |
| 3 | Turbine group |
| 4 | Compressor group |
| 5 | Main turbine |
| 6 | Additional turbine |
| 7 | Main combustion chamber |
| 8 | Additional combustion chamber |
| 9 | Turbine shaft |
| 10 | Generator |
| 11 | Main load |
| 12 | Compressor |
| 13 | Compressor shaft |
| 14 | Generator/electric motor unit |
| 15 | Electric motor |
| 16 | Rotor of 10, 14, 15 |
| 17 | Turbine clutch |
| 18 | Compressor clutch |
| 19 | Recuperator |
| 20 | Power consumption device |
| 21 | Static frequency converter |
| 22 | Flywheel |
| 23 | Shaft |
| 24 | Burner |
| 25 | Resistor |
| 26 | Cooling circuit |
| 27 | Control and/or regulating device |
| 28 | Control line |
| 29 | Friction brake |
| 30 | Heat sink |

The invention claimed is:

1. A gas storage power station comprising:
   at least one turbine group which has at least one turbine and at least one generator which are connected or connectable to one another for drive purposes, with the generator giving power directly to at least one predetermined main load during normal operation of the turbine group, and
   a least one compressor group which has at least one compressor and at least one electric motor which are connected or connectable to one another for drive purposes, and
   a power consumption device for controlling turbine acceleration by transferring at least one of turbine and generator power to an electrical consumer.

2. The gas storage power station as claimed in claim 1, wherein
   a control and/or regulating device is provided, which regulates and/or controls the power consumption device such that the turbine rotation speed does not exceed a predetermined threshold value.

3. The gas storage power station as claimed in claim 1, wherein
   a control and/or regulating device is provided, which regulates and/or controls the power consumption device such that the power consumption of the power consumption device compensates for any difference between a nominal power, which can be given off directly from the generator to the at least one main load, and an instantaneously available actual power.

4. The gas storage power station as claimed in claim 1, wherein
   the power consumption device has a static frequency converter which takes electrical power from the generator when the power consumption device is activated, and emits electrical power to at least one electrical additional load.

5. The gas storage power station as claimed in claim 4, wherein
   the frequency converter emits electrical power to the at least one electric motor.

6. The gas storage power station as claimed in claim 4, wherein
   the frequency converter emits electrical power to the at least one main load.

7. The gas storage power station as claimed in claim 1, wherein
   the power consumption device has an electrical resistor which takes electrical power from the generator and converts it to heat, when the power consumption device is activated.

8. The gas storage power station as claimed in claim 7, wherein
   the resistor is cooled by a cooling medium, with the heat which is drawn away from the cooling medium being supplied to at least one heat sink.

9. The gas storage power station as claimed in claim 1, wherein
   the power consumption device has additionally a braking device in order to draw off drive power from the shaft of at least one turbine.

10. The gas storage power station as claimed in claim 9, wherein
    the braking device has a flywheel, which stores the drive power that has been drawn off as kinetic energy.

11. The gas storage power station as claimed in claim 9, wherein
    the braking device has a friction brake which converts the drawn-off drive power essentially to heat.

12. The gas storage power station as claimed in claim 11, wherein
    the friction brake is cooled by a cooling medium, with the heat which is drawn away by the cooling medium being supplied to at least one heat sink.

13. The gas storage power station as claimed in claim 9, wherein
    the braking device has a clutch device which connects a shaft which is driven by the at least one turbine in a manner which can be controlled and/or regulated to a shaft which drives the at least one compressor in the compressor group, such that a greater or lesser amount of drive power is drawn off for driving the at least one compressor by means of appropriate operation of the clutch device when the power consumption device is activated.

14. The gas storage power station as claimed in claim 1, wherein
at least one of the turbine groups and at least one of the compressor groups are in the form of an arrangement with a common shaft or an arrangement with separate shafts.

15. The gas storage power station as claimed in claim 9, wherein the braking device is in the form of an impulse wheel.

* * * * *